(12) United States Patent
Maehara

(10) Patent No.: US 7,773,927 B2
(45) Date of Patent: Aug. 10, 2010

(54) INTERMEDIATE TRANSFER MEMBER, METHOD OF MANUFACTURING INTERMEDIATE TRANSFER MEMBER, AND IMAGE FORMING APPARATUS

(75) Inventor: Yuichiro Maehara, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 116 days.

(21) Appl. No.: 12/090,109

(22) PCT Filed: Sep. 28, 2006

(86) PCT No.: PCT/JP2006/319246

§ 371 (c)(1),
(2), (4) Date: Apr. 14, 2008

(87) PCT Pub. No.: WO2007/046218

PCT Pub. Date: Apr. 26, 2007

(65) Prior Publication Data
US 2009/0041514 A1 Feb. 12, 2009

(30) Foreign Application Priority Data
Oct. 20, 2005 (JP) .................... 2005-305435

(51) Int. Cl.
*G03G 15/01* (2006.01)
(52) U.S. Cl. ..................................... 399/302
(58) Field of Classification Search ............... 399/159, 399/162, 302, 303, 308, 312, 313; 428/217; 430/125.32

See application file for complete search history.

(56) References Cited

U.S. PATENT DOCUMENTS

| 5,709,936 | A * | 1/1998 | Besmann et al. ............ 428/323 |
| 5,807,651 | A * | 9/1998 | Rimai et al. .................. 430/11 |
| 6,393,226 | B1 * | 5/2002 | Charlebois et al. ........... 399/12 |
| 7,488,563 | B2 * | 2/2009 | Rimai et al. ........... 430/123.51 |
| 7,504,276 | B2 * | 3/2009 | Hasebe et al. ................ 438/53 |
| 2007/0019982 | A1 * | 1/2007 | Kawada et al. .............. 399/96 |
| 2007/0048013 | A1 * | 3/2007 | Tokutake et al. ............ 399/159 |
| 2007/0188585 | A1 * | 8/2007 | Mochizuki et al. .......... 347/140 |
| 2007/0282051 | A1 * | 12/2007 | Okano ........................ 524/495 |
| 2008/0310890 | A1 * | 12/2008 | Inada et al. ................. 399/302 |
| 2008/0310892 | A1 * | 12/2008 | Inada et al. ................. 399/308 |
| 2009/0060598 | A1 * | 3/2009 | Kondo et al. ................ 399/297 |
| 2009/0067895 | A1 * | 3/2009 | Tominaga ................... 399/308 |

FOREIGN PATENT DOCUMENTS

| JP | 09-026707 | 1/1997 |
| JP | 09-212004 | 8/1997 |
| JP | 2002287012 A * | 10/2002 |

\* cited by examiner

*Primary Examiner*—Robert Beatty
(74) *Attorney, Agent, or Firm*—Lucas & Mercanti, LLP (57) ABSTRACT

An objective is to provide an intermediate transfer member exhibiting higher transferability together with higher cleaning ability and durability, a manufacturing apparatus of an intermediate transfer member in which no large-scale equipment such as a vacuum evaporator or the like is installed, and an image forming apparatus fitted with the intermediate transfer member. Also disclosed is intermediate transfer member 170 possessing substrate 175 and surface layer 176 composed of at least one layer provided on the surface of substrate 175, wherein foregoing substrate 175 has a universal hardness of 50-190 N/mm$^2$, and foregoing surface layer 176 has a surface hardness of 3-11 GPa measured in accordance with a nanoindentation method.

6 Claims, 5 Drawing Sheets

INTERMEDIATE TRANSFER MEMBER, METHOD OF MANUFACTURING INTERMEDIATE TRANSFER MEMBER, AND IMAGE FORMING APPARATUS

This is a U.S. National Phase Application under 35 U.S.C. 371 of International Application PCT/JP2006/319246, filed on Sep. 28, 2006.

This Application claims the priority of Japanese Application No. 2005-305435, filed Oct. 20, 2005, the entire content of which is hereby incorporated by reference.

TECHNICAL FIELD

The present invention relates to an intermediate transfer member, a method of manufacturing the intermediate transfer member and an image forming apparatus fitted with the intermediate transfer member to be transferred by synthesizing a toner image with respect to each of colors for a color image in electrophotographic apparatuses and electrostatic recording apparatuses such as an electronic copying machine, a laser beam printer, a facsimile machine and so forth.

BACKGROUND

In the past, as a method of transferring a toner image on an electrophotographic photoreceptor (hereinafter, also referred to simply as a photoreceptor) onto a recording material for a final image, there has been known a method of direct transfer of a toner image formed on an electrophotographic photoreceptor onto a recording material. On the other hand, there is known an image forming system, the system employing an intermediate transfer member, in which a transfer process of transferring a toner image from an electrophotographic photoreceptor to a recording material incorporates another transfer process, wherein the toner image is primarily transferred from the electrophotographic photoreceptor to the intermediate transfer member, then the primary transfer image in the intermediate transfer member is secondarily transferred to the recording member, thereby the image forming system obtaining a final image. An intermediate transfer system as described above is mostly employed as a superimposing transfer system that superimposes toner images of respective colors in a so-called full color image forming apparatus, wherein the superimposing transfer system reproduces an original image, the original image having been color-separated, with use of a subtractive mixture of toners of black, cyan, magenta, yellow, etc.

However, in the case of a superimposing transfer system fitted with this intermediate transfer member, image failure caused by transfer failure of a toner image tends to be generated since transferring twice such as the primary transfer and the secondary transfer is conducted, and four color toners are also superimposed on the intermediate transfer member.

It is commonly known that transfer efficiency can be improved by treating the toner surface with additives such as silica and the like against transfer failure of toner. However, there is a problem such that sufficient transfer efficiency can not be obtained since silica is removed from the toner surface, and embedded inside the toner because of stress influenced from a stirring member of toner in a developing device, stress influenced from a regulation blade to form a toner layer on a developing roller, stress influenced between a photoreceptor and a developing roller, and so forth.

In order to solve such the problem, it is disclosed that detachability of toner images is improved by coating silicon oxide, aluminum oxide or the like onto the intermediate transfer member surface, whereby transfer efficiency to a recording paper sheet or such is tried to be improved (refer to Patent Documents 1 and 2, for example).

Patent Document 1: Japanese Patent O.P.I. Publication No. 9-212004

Patent Document 2: Japanese Patent O.P.I. Publication No. 2001-347593

DISCLOSURE OF THE INVENTION

Problems to be Solved by the Invention

However, since in the case of an image forming apparatus fitted with an intermediate transfer member, it is nearly impossible at present to transfer 100% of toner images during secondary transfer, a cleaning device to scrape residual toner off the intermediate transfer member with a blade is desired to be arranged, for example.

There is a problem such that life of an intermediate transfer member is short, since durability of the intermediate transfer member described in Patent Documents 1 and 2 is insufficient. There is also a problem such that image defects tend to be generated because of scratched thin films caused by paper jam or the like, since thin films are easily scratched by disturbance because of insufficient film coating and film strength. Further, there was a problem concerning productivity such that large-scale equipment such as a vacuum evaporator or the like is demanded since silicon oxide, aluminum oxide and so forth are arranged to be deposited via vacuum evaporation or sputtering.

In consideration of the above-described problem, it is an object of the present invention to provide an intermediate transfer member exhibiting higher transferability together with higher cleaning ability and durability, a manufacturing apparatus of an intermediate transfer member in which no large-scale equipment such as a vacuum evaporator or the like is installed, and an image forming apparatus fitted with the intermediate transfer member.

Means to Solve the Problems

The above described object of the present invention is accomplished by the following structures.

(Structure 1) An intermediate transfer member comprising a substrate and provided thereon, a surface layer comprising at least a layer, wherein the substrate has a universal hardness of 50-190 N/mm$^2$, and the surface layer has a surface hardness of 3-11 GPa measured in accordance with a nanoindentation method.

(Structure 2) The intermediate transfer member of Structure 1, wherein the surface layer has a thickness of 200-1000 nm.

(Structure 3) A method of manufacturing the intermediate transfer member of Structure 1 or 2, comprising the step of forming at least an outermost layer of the surface layer on the substrate by an atmospheric pressure plasma CVD method, wherein the at least an outermost layer has a carbon atom content of 20 atomic percent or less, determined via XPS measurement.

(Structure 4) A method of manufacturing the intermediate transfer member of Structure 1 or 2, comprising the step of forming at least a layer of the surface layer on the substrate by an atmospheric pressure plasma CVD method, wherein the at least a layer has a carbon atom content of 20 atomic percent or less, determined via XPS measurement.

(Structure 5) An image forming apparatus comprising the intermediate transfer member of Structure 1 or 2, wherein a toner image is formed by developing a surface of an image carrier, and the toner image is transferred into the intermediate transfer member and subsequently further transferred into a transfer paper sheet.

Effect of the Invention

The following effects can be produced via the present invention. That is, by utilizing an intermediate transfer member comprising a substrate and provided thereon, a surface layer comprising at least a layer, wherein the substrate has a universal hardness of 50-190 $N/mm^2$, and the surface layer has a surface hardness of 3-11 GPa measured in accordance with a nanoindentation method, that is described in Structure 1, provided can be the intermediate transfer member exhibiting an excellent releasing property with toner, together with improved transfer efficiency and excellent durability.

Also provided can be a manufacturing apparatus of the intermediate transfer member in which no large-scale equipment such as a vacuum evaporator or the like is installed, exhibiting an excellent releasing property with toner, together with improved transfer efficiency and excellent durability by utilizing a method of manufacturing the intermediate transfer member, comprising the step of forming at least an outermost layer of the surface layer on the substrate by an atmospheric pressure plasma CVD method, wherein the at least an outermost layer has a carbon atom content of 20 atomic percent or less, determined via XPS measurement, as described in Structure 3. A thin film easily containing carbon atoms, and exhibiting excellent durability is also possible to be formed via this method.

Further provided can be a manufacturing apparatus of the intermediate transfer member in which no large-scale equipment such as a vacuum evaporator or the like is installed, exhibiting an excellent releasing property with toner, together with improved transfer efficiency and excellent durability by utilizing a method of manufacturing the intermediate transfer member, comprising the step of forming at least a layer of the surface layer on the substrate by an atmospheric pressure plasma CVD method, wherein the at least a layer has a carbon atom content of 20 atomic percent or less, determined via XPS measurement, as described in Structure 4. A thin film easily containing carbon atoms, and exhibiting excellent durability is also possible to be formed via this method.

Furthermore, provided can be an image forming apparatus fitted with the intermediate transfer apparatus of Structure 1 or 2, exhibiting high transferability together with high cleaning ability and durability, as described in Structure 5.

BRIEF DESCRIPTION OF THE DRAWINGS

FIG. 9($a$) and FIG. 9($b$) each are a schematic diagram showing an example of the roll electrode.

FIG. 10($a$) and FIG. 10($b$) each are a schematic diagram showing an example of fixed electrodes.

EXPLANATION OF NUMERALS

1 Color image forming apparatus
2 Manufacturing apparatus of intermediate transfer member
3 Atmospheric pressure plasma CVD apparatus
17 Intermediate transfer member unit
20 Roll electrode
21 Fixed electrode
23 Discharge space
24 Mixed gas supply device
25 First electric supply
26 Second electric supply
117 Secondary transfer roller
170 Intermediate transfer belt
175 Substrate
176 Surface layer
201 Driven roller

DESCRIPTION OF THE PREFERRED EMBODIMENTS

Embodiments of the present invention will be described below, but the description below limits neither technical scope nor definition of terms of the claims thereto.

An intermediate transfer member of the present invention is preferably used in an image forming apparatus such as an electrophotographic type copier, printer and facsimile. Any type of a transfer body is applicable as long as a toner image held on the surface of a photoreceptor is primarily transferred to the surface of the transfer body, the transfer body holds the transferred toner image, and the transfer body secondarily transfers the held toner image to the surface of an image forming material such as a recording sheet, onto which to transfer the image, wherein the intermediate transfer member may be in a belt form or in a drum shape.

First, an image forming apparatus fitted with an intermediate transfer member of the present invention will be described, taking a tandem type full-color copier as an example.

Figure 1:
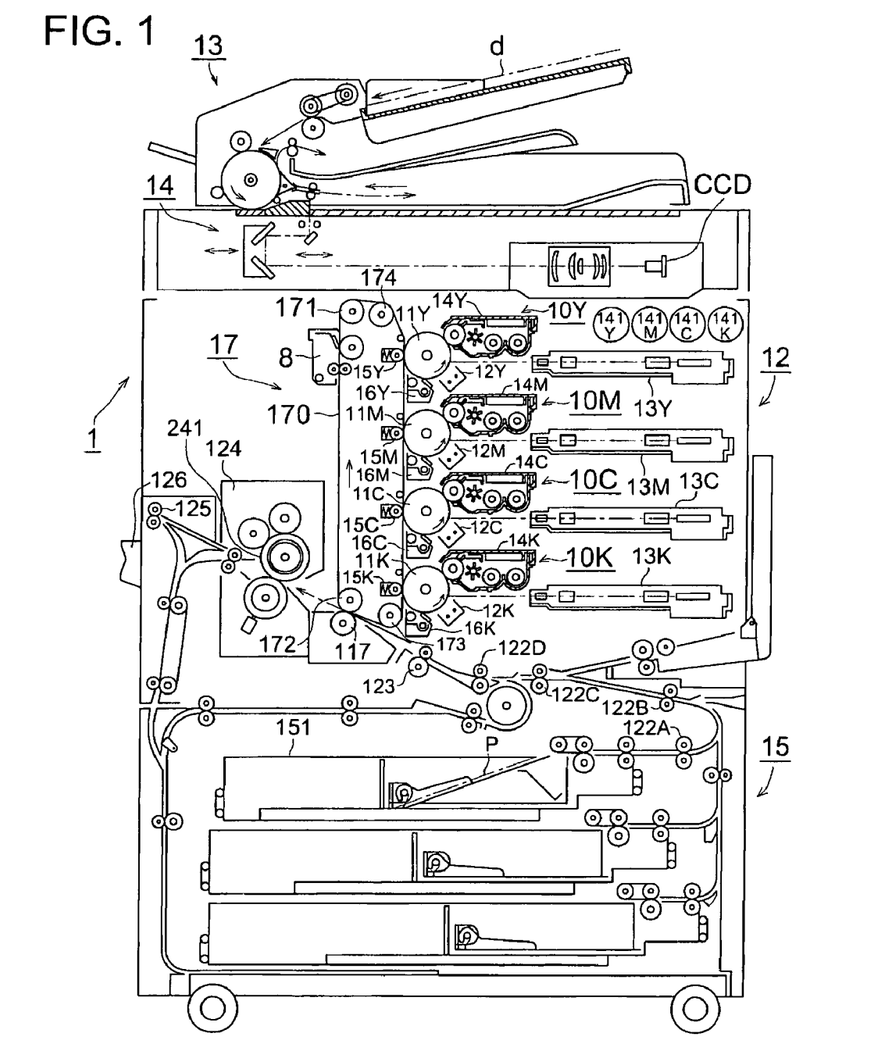
FIG. 1 is a cross-sectional diagram showing an example of a color image forming apparatus.

FIG. 1 is a cross-sectional schematic diagram showing an example of a color image forming apparatus.

Color image forming apparatus 1 is called a tandem type full-color copier, and is fitted with automatic document conveying device 13, original document reading device 14, plural exposure units 13Y, 13M, 13C and 13K, plural image forming sections 10Y, 10M, 10C and 10K, intermediate transfer member unit 17, sheet feeding unit 15 and fixing device 124.

Around the upper portion of main body 12 of the image forming apparatus, disposed are automatic document conveying device 13 and original document reading device 14. An image of original document d conveyed by automatic document conveying device 13 is reflected and caused to form an image by an optical system of image reading device 14, and the image is read by line image sensor CCD.

An analog signal produced by photoelectric conversion of an image of an original document read by the line image sensor CCD is subjected, in an image processing section (not shown), to analog processing, A/D conversion, shading calibration, image compression processing and the like, thereafter transmitted to exposure units 13Y, 13M, 13C and 13K as digital image data of the respective colors, and then latent images of the image data of the respective colors are formed by exposure units 13Y, 13M, 13C and 13K on photoreceptors 11Y, 11M, 11C and 11K in the form of drum (hereinafter, also referred to as photoreceptors) as corresponding first image carriers.

Image forming sections 10Y, 10M, 10C and 10K are disposed in tandem in the vertical direction, and an intermediate transfer member (hereinafter, referred to as an intermediate transfer belt) 170, in accordance with the present invention, which is a second image carrier being semiconductive and in an endless belt form is disposed on the left side, in the figure, of photoreceptors 11Y, 11M, 11C and 11K, wherein intermediate transfer belt 170 is wound around rollers 171, 172, 173 and 174 and thus rotatably tension-supported.

Intermediate transfer belt 170 of the present invention is driven along the arrow direction through roller 171 which is rotationally driven by an unshown drive unit.

Image forming section 10Y for forming yellow color images includes charging unit 12Y, exposure unit 13Y, development unit 14Y, primary transfer roller 15Y as primary transfer means, and cleaning unit 16Y which are disposed around photoreceptor 11Y.

Image forming section 10M for forming magenta color images includes photoreceptor 11M, charging unit 12M, exposure unit 13M, development unit 14M, primary transfer roller 15M as primary transfer means, and cleaning unit 16M.

Image forming section 10C for forming cyan color images includes photoreceptor 11C, charging unit 12C, exposure unit 13C, development unit 14C, primary transfer roller 15C as primary transfer means, and cleaning unit 16C.

Image forming section 10K for forming black color images includes photoreceptor 11K, charging unit 12K, exposure unit 13K, development unit 14K, primary transfer roller 15K as primary transfer means, and cleaning unit 16K.

Toner supply units 141Y, 141M, 141C and 141K supply new toner to respective development units 14Y, 14M, 14C and 14K.

Herein primary transfer rollers 15Y, 15M, 15C and 15K are selectively operated by an unshown control unit corresponding to the image type, and press intermediate transfer belt 170 against respective photoreceptors 11Y, 11M, 11C and 11K to transfer images on the photoreceptors.

In such a manner, the images in the respective colors formed on photoreceptors 11Y, 11M, 11C and 11K by image forming sections 10Y, 10M, 10C and 10K are sequentially transferred to circulating intermediate transfer belt 170 by primary transfer rollers 15Y, 15M, 15C and 15K so that synthesized color images are formed.

That is, the toner images carried on the surfaces of the photoreceptors are primarily transferred to the surface of the intermediate transfer belt, and the intermediate transfer belt holds the transferred toner image.

Recording sheet P as a recording medium stored in sheet supply cassette 151 is fed by sheet feeding unit 151, then conveyed into secondary transfer roller 117 as a secondary transfer means through plural intermediate rollers 122A, 122B, 122C, 122D and registration roller 123, and then the synthesized toner images on the intermediate transfer member are transferred all together onto recording sheet P by secondary transfer roller 117.

That is, the toner image held on the intermediate transfer member is secondarily transferred onto the surface of the transferred material.

Herein, secondary transfer roller 117 presses recording medium P against intermediate transfer belt 170 only when recording medium P passes through here to perform secondary transferring.

Recording sheet P onto which the color image has been transferred is subjected to a fixing treatment by fixing device 124, and nipped by sheet-ejection rollers 125 to be loaded on sheet-ejection tray 126 equipped outside the apparatus.

On the other hand, after the color image is transferred to recording medium P by secondary transfer roller 117, residual toner on intermediate transfer belt 170 having curvature-separated recording sheet P is removed by cleaning unit 8.

Herein, the intermediate transfer member may be replaced by a rotatable intermediate transfer drum as described above.

Next, the structure of primary transfer rollers 15Y, 15M, 15C and 15K as first transfer units being in contact with intermediate transfer belt 170, and the structure of secondary transfer roller 117 will be described.

Primary transfer rollers 15Y, 15M, 15C and 15K are formed, for example, by coating the circumferential surface of a conductive core metal of stainless or the like with an outer diameter of 8 mm, with a semiconductive elastic rubber having a thickness of 5 mm and a rubber hardness in an approximate range of 20-70 degrees (Asker hardness C). Herein, the semiconductive elastic rubber is prepared by making a rubber material such as polyurethane, EPDM, silicon or the like into a solid state or foam sponge state with a volume resistance in an approximate range of $10^5$-$10^9$ Ω·cm, dispersing conductive filler such as carbon, to the rubber material or having the rubber material contain an ionic conductive material.

Secondary transfer roller 117 is formed, for example, by coating a circumferential surface of a conductive core metal of stainless or the like with an outer diameter of 8 mm, with a semiconductive elastic rubber having a thickness of 5 mm and a rubber hardness in an approximate range from 20 to 70 degrees (Asker hardness C). Herein, the semiconductive elastic rubber is prepared by making a rubber material, such as polyurethane, EPDM, silicon or the like into a solid state or foam sponge state with a volume resistance in an approximate range of $10^5$-$10^9$ Ω·cm, dispersing conductive filler such as carbon, to the rubber material or having the rubber material contain an ionic conductive material.

Herein, secondary transfer roller 117 is different from each of primary transfer rollers 15Y, 15M, 15C and 15K in that toner can contact secondary transfer roller 117 in a state where no recording sheet P is present. Accordingly, the surface of secondary transfer roller 117 is preferably coated with a material exhibiting a sufficient releasing property, such as a semiconductive fluorine resin, urethane resin or the like. Secondary transfer roller 117 is formed by coating a circumferential surface of a conductive core metal of stainless or the like, with a semiconductive material having a thickness in an approximate range from 0.05 to 0.5 mm. Herein, the semiconductive material is prepared by dispersing conductive filler such as carbon, to a rubber or resin material such as polyurethane, EPDM, silicon or the like, or having the rubber or resin material contain an ionic conductive material.

Figure 2:
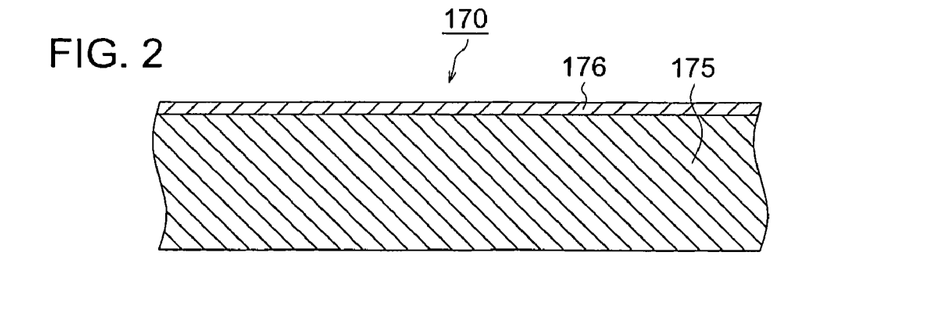
FIG. 2 is a conceptual cross-sectional view showing a layer structure of the intermediate transfer member.

An intermediate transfer member of the present invention will be described below, taking intermediate transfer belt 170 as an example.

FIG. 2 is a conceptual cross-sectional view showing a layer structure of the intermediate transfer member.

Intermediate transfer belt 170 possesses substrate 175 and surface layer 176 composed of at least one layer provided on the surface of substrate 175, the foregoing substrate has a universal hardness of 50-190 N/mm² and foregoing surface layer 176 has a surface hardness of 3-11 GPa measured in accordance with a nanoindentation method.

Next, structural factors of intermediate transfer belt 170 of the present invention will be described.

(Substrate)

A belt formed by dispersing a conductive agent in a resin material is usable as substrate 175 for intermediate transfer belt 170 of the present invention. Examples of the resin usable for the belt include so-called engineering plastic materials such as polycarbonate, polyimide, polyetherether ketone, polyvinylidene fluoride, an ethylenetetrafluoroethylene copolymer, polyamide, polyphenylene sulfide and so forth. Carbon black can also be used as the conductive agent, and neutral or acidic carbon black can be used as the carbon black. The conductive filler may be added in such a way that volume resistance and surface resistance of intermediate transfer belt 170 are in the predetermined range, depending on kinds of the employed conductive filler. The consumption amount of the conductive filler is commonly 10-20 parts by weight, and preferably 10-16 parts by weight with respect to 100 parts by weight of resin material. Substrate 175 employed for the present invention is possible to be manufactured by a commonly known conventional method. For example, a resin as a material is dissolved in an extruder, and rapidly cooled via extrusion with a ring die or a T-die to prepare it.

Substrate 175 has a thickness of 50-200 μm in the case of a resin material, and a thickness of 300-700 μm in the case of a rubber material.

In the present invention, substrate 175 preferably has a universal hardness of 50-190 $N/mm^2$.

Hardness of the substrate can be adjusted by changing resin kinds.

The universal hardness can be measured not only after preparing substrate 175, but also after preparing substrate 175 and then forming surface layer 176.

As for an intermediate transfer member, hardness of a substrate thereof is specified by universal hardness as shown below. The universal hardness is obtained from following equation (1) when an indenter was pushed into an object to be measured while applying a load to the indenter:

Universal hardness=(Test load)/(contact surface area of an indenter with an object to be measured under test load), Equation (1)

where the unit is $N/mm^2$. The universal hardness can be measured employing a commercially available hardness meter. For example, an ultrafine hardness meter "H-100V" (by Fischer Instrument Inc.) is usable for this measurement. In the case of this measuring apparatus, an indenter of quadrangular pyramid or triangular pyramid is pushed into the object to be measured, while a test load is applied thereto. When a predetermined depth has been reached, the surface area of the indenter in contact with the object to be measured is obtained from that depth. The universal hardness is calculated from above-described equation (1).

(Surface Layer)

Next, surface layer 176 of the present invention is formed on substrate 175.

Surface layer 176 of the present invention is preferably formed from an inorganic compound made of an inorganic oxide, inorganic nitride, inorganic carbide or their composite material.

Examples of the inorganic oxide employed for surface layer 176 of the present invention include silicon oxide, aluminum oxide, tantalum oxide, titanium oxide, tin oxide, zinc oxide, iron oxide, vanadium oxide, beryllium oxide, zirconium oxide, barium strontium titanate, barium titanate zirconate, lead titanate zirconate, lead lanthanum titanate, strontium titanate, barium titanate, bismuth titanate, strontium bismuth titanate, strontium bismuth tantalite, bismuth niobate tantalite and yttrium trioxide. Of these, silicon oxide, aluminum oxide and titanium oxide are preferable.

The material contained in surface layer 176 of the present invention may possess a kind of inorganic compound, and may also possess two kinds of inorganic compounds.

Surface layer 176 of the present invention may possess at least one layer, and the one layer preferably has a carbon atom content of 20 atomic percent or less, measured by XPS.

Composition analysis of the surface layer via XPS measurement can be made employing an X-ray photoelectron spectroscopy measuring device, manufactured by VG Scientific Ltd. Contaminant of atoms adsorbed onto the outermost surface was removed via argon ion etching during measurement. In a similar manner, the composition for each of plural layers can also be determined via the foregoing etching.

When the carbon atom content, measured by XPS, is arranged to be set to 20 atomic percent or less, no crack caused by flexing during belt-conveyance tends to be generated, whereby durability is improved. The content of carbon atoms can be adjusted by adjusting the film-forming conditions of high frequency power supply output power, an addition gas amount ratio, a raw material gas amount ratio, substrate temperature and so forth. At least one layer included in surface layer 176 of the present invention may have a carbon atom content of 20 atomic percent or less, preferably have a carbon atom content of 0.1-15 atomic percent, and more preferably have a carbon atom content of 0.1-5 atomic percent.

A surface treatment such as a corona treatment, a flame treatment, a plasma treatment, a glow discharge treatment, a roughened surface treatment or a chemical treatment may be conducted before forming surface layer 176 of the present invention on substrate 175.

Further, a primer layer may be formed between surface layer 176 of the present invention and substrate 175 in order to improve adhesion. Primers used for the primer layer include a polyester resin, such as an isocyanate resin, a urethane resin, an acrylic resin, an ethylene vinyl alcohol resin, a vinyl-modified resin, an epoxy resin, a modified styrene resin, a modified silicon resin, alkyl titanate and so forth can be used singly or in combination with at least two kinds. Commonly known additives can also be added into these primers. The above-described primer can be coated on a substrate employing a commonly known method such as a roll coating method, a gravure coating method, a knife coating method, a dip coating method, a spray coating method or the like, and be primed by removing a solvent, a diluent and so forth via drying. The above-described primer preferably has a coating amount of 0.1-5 $g/m^2$ (dry state).

Surface layer 176 of the present invention has a thickness of 200-1000 nm, preferably has a thickness of 200-600 nm, and more preferably has a thickness of 250-500 nm.

In the case of surface layer 176 having a thickness of less than 200 nm, scratches are generated via transfer into a heavy paper sheet, and end up with wear of the thin film because of insufficient durability and surface strength, whereby the toner transfer ratio is lowered. In the case of surface layer 176 having a thickness exceeding 1000 nm, it is not preferable in view of productivity that not only cracking and peeling tend to be generated via repetitive use, but also a duration consumed for film formation is increased because of insufficient adhesion and flexing resistance.

Surface layer 176 preferably has a surface hardness of 3-11 GPa, measured by a nanoindentation method.

The hardness of the surface layer can also be adjusted by adjusting the film-forming conditions of an addition gas amount ratio, a raw material gas amount ratio, high frequency power supply output power, substrate temperature and so forth.

The method of measuring hardness with a nano indentation method is a method of calculating plastic deformation hardness from the value obtained by measuring the relationship between a load and push-in depth (amount of displacement) while pushing a very small diamond indenter into a thin film. In the case of a film thickness of specifically 1 μm or less, it is a feature that no crack on the thin film tends to be generated during push-in, together with no dependence on the substrate property. This is generally usable for measuring matter properties of a very thin film.

Figure 3:
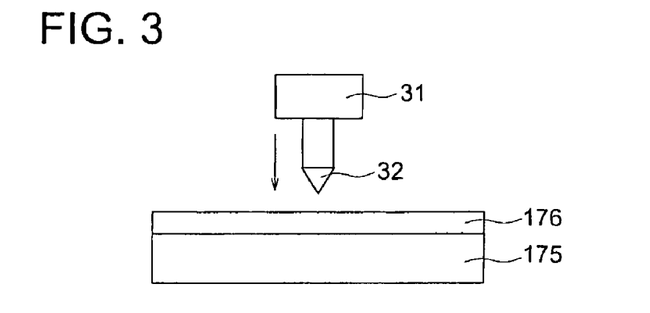
FIG. 3 is a diagram showing an example of a measuring device employing a nanoindentation method.

FIG. 3 is a diagram showing an example of a measuring device employing a nanoindentation method. The amount of displacement can be measured to an accuracy of nanometer while applying a load in μN by this measuring device, employing transducer 31 and diamond Berkovich indenter 32 having an equilateral-triangular tip shape. A commercially available "NANO Indenter XP/DCM" (manufactured by MTS Systems Corp./MTS NANO Instruments, Inc.) is usable for this measurement.

Figure 4:
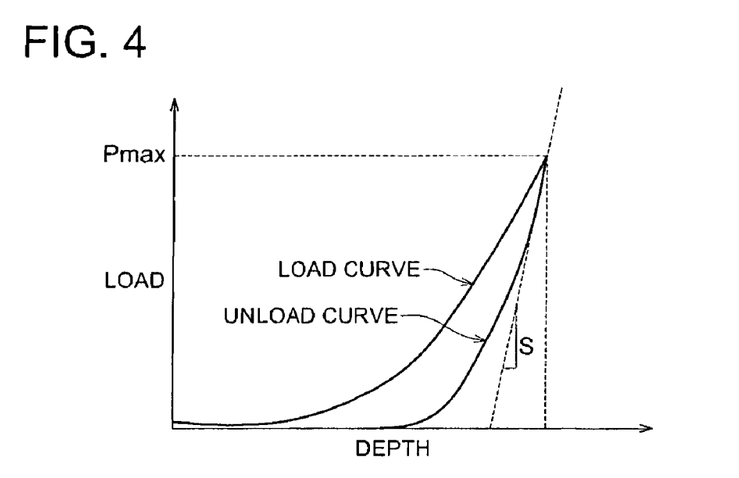
FIG. 4 is a diagram showing a load-displacement curve obtained by a nanoindentation method.
Figure 5:
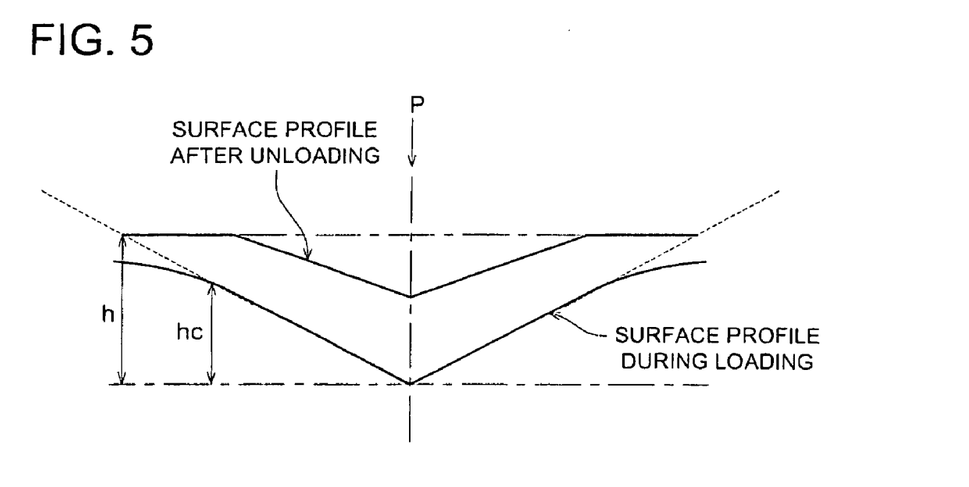
FIG. 5 is a diagram showing a contacting situation between an indenter and a sample.

FIG. 4 shows a typical load-displacement curve obtained by a nanoindentation method, and FIG. 5 is a diagram showing a contacting situation between an indenter and a sample.

Hardness H is determined from the following equation,

H=Pmax/A, where Pmax is the maximum load applied to an indenter, and A is the contact projection area between the indenter and the sample.

Contact projection area A is expressed by the following equation, employing hc in FIG. 5.

A=24.5 hc², where hc expressed by the following equation is shallower than total push-in depth h because of elastic indentation of the periphery surface of a contact point as shown in FIG. 5.

hc=h−hs, where hs indicating an indentation amount caused by elasticity is expressed by the following equation, using a load curve slope after pushing in an indenter (slope S in FIG. 4) and an indenter shape.

$$hs = \in \times P/S$$

where ∈ is a constant concerning the indenter shape to be 0.75 in the case of a Berkovich indenter.

Hardness of the surface of surface layer 176 formed on substrate 175 can be measured employing a measuring device with such the nanoindentation method.

Next, an apparatus, method and using gas in the case of forming a surface layer of an intermediate transfer member of the present invention via atmospheric pressure plasma CVD will be described.

Figure 6:
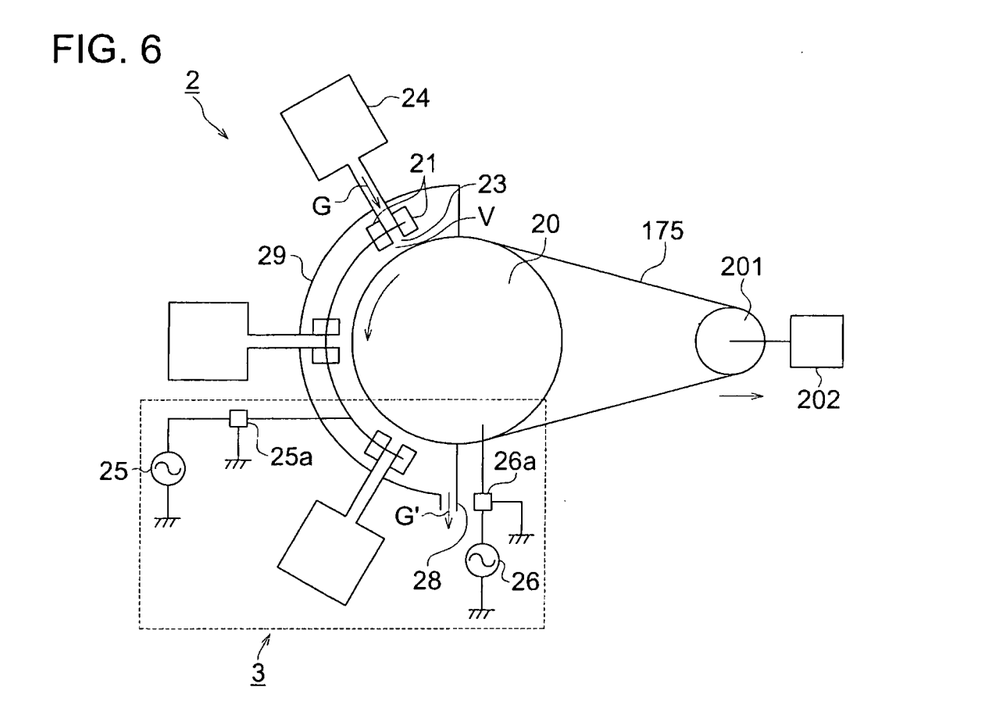
FIG. 6 is a schematic diagram of a first manufacturing apparatus to produce an intermediate transfer member.

FIG. 6 is a schematic diagram of a first manufacturing apparatus to produce an intermediate transfer member.

Manufacturing apparatus 2 of an intermediate transfer member (a direct type in which the electric discharge space and the thin film depositing area are substantially identical) which forms surface layer 176 on substrate 175, includes: roll electrode 20 that rotatably supports substrate 175 of endless belt-shaped intermediate transfer member 170 and rotates in the arrow direction; driven roller 201; and atmospheric pressure plasma CVD device 3 which is a film-forming device to form surface layer 176 on the surface of substrate 175.

Atmospheric pressure plasma CVD device 3 includes: at least one set of fixed electrode 21 disposed along the outer circumference of roll electrode 20; electric discharge space 23 which is a facing region between fixed electrode 21 and roll electrode 20 where electric discharge is performed; mixed gas supply device 24 which produces mixed gas G of at least a raw material gas and a discharge gas to supply mixed gas G to discharge space 23; electric discharge container 29 which reduces air flow into, for example, discharge space 23; first power supply 25 connected to roll electrode 20; second power supply 26 connected to fixed electrode 21; and gas exhaustion section 28 for used exhausting gas G'.

Mixed gas supply device 24 supplies a mixed gas of a raw material gas and nitrogen gas or a rare gas such as argon gas, into discharge space 23, in order to form a film possessing at least one layer selected from an inorganic oxide layer, an inorganic nitride layer and an inorganic carbide layer.

Driven roller 201 is pulled in the arrow direction by tension-providing unit 202 and applies a predetermined tension to substrate 175. Tension-providing unit 202 releases providing of tension, for example, during replacement of substrate 175, allowing easy replacement of substrate 175.

First power supply 25 provides a voltage of frequency ω1, second power supply 26 provides a voltage of frequency of ω2, and these voltages generate electric field V where frequencies ω1 and ω2 are superposed in discharge space 23. Electric field V plasmatizes mixed gas G to deposit a film (surface layer 176) on the surface of substrate 175, corresponding to the raw material gas contained in mixed gas G.

Herein, surface layer 176 may be deposited in lamination employing the mixed gas supply devices and the plural fixed electrodes disposed on the downstream side with respect to the rotation direction of the roll electrode, among the plural fixed electrodes, so as to adjust the thickness of surface layer 176.

Further, surface layer 176 may be deposited employing the mixed gas supply devices and the fixed electrodes disposed on the downstream side with respect to the rotation direction of the roll electrode, among the plural fixed electrodes, while another layer, for example, a adhesive layer to improve adhesion between surface layer 176 and substrate 175, may be formed by the other mixed gas supply devices and fixed electrodes disposed on the upperstream side.

Further, in order to improve adhesion between surface layer 176 and substrate 175, gas supply devices to supply gas, such as argon gas or oxygen gas, and fixed electrodes may be arranged on the upstream side of the fixed electrodes and the mixed gas supply devices that form surface layer 176, so as to conduct a plasma treatment and thereby activating the surface of substrate 175.

As described above, an intermediate transfer belt being an endless belt is tension-supported by a pair of rollers; one of the pair of rollers is used for one of a pair of electrodes; at least one fixed electrode as the other electrode is provided along the outer circumferential surface of the roller which works as the one electrode; an electric field is generated between the pair of electrodes at an atmospheric pressure or an approximately atmospheric pressure to perform plasma discharge, so that a thin film is deposited and formed on the surface of the intermediate transfer member. Thus, it is possible to provide an intermediate transfer member exhibiting high transferability, high cleaning performance and high durability.

Figure 7:
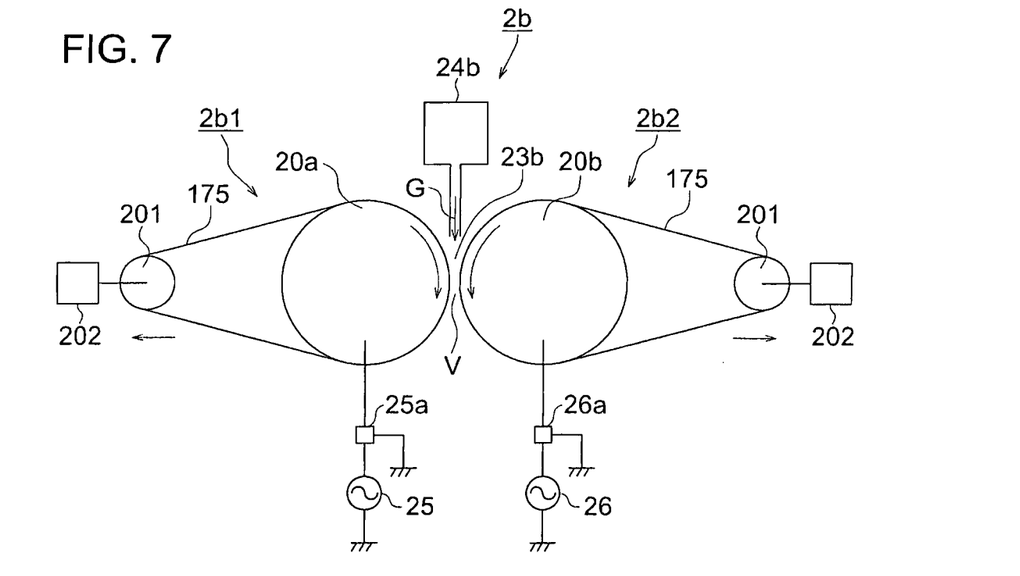
FIG. 7 is a schematic diagram of a second manufacturing apparatus to produce an intermediate transfer member.

FIG. 7 is a schematic diagram of a second manufacturing apparatus to produce an intermediate transfer member.

Second manufacturing apparatus 2b for an intermediate transfer member forms a surface layer on each of plural substrates simultaneously, and mainly includes plural film-forming devices 2b1 and 2b2 each of which forms a surface layer on each of the substrate surfaces.

Second manufacturing apparatus 2b (modification of a direct type, that performs electric discharge between facing roll electrodes to deposit a thin film) includes: first film-forming device 2b1; second film-forming device 2b2 being disposed in a substantial mirror image relationship at a predetermined distance from first film-forming device 2b1; and mixed gas supply device 24b that produces mixed gas G of at least a raw material gas and a discharge gas to supply mixed gas G to electric discharge space 23b, mixed gas supply device 24b being disposed between first film-forming device 2b1 and second film-forming device 2b2.

First film-forming device 2b1 includes: roll electrode 20a and driven roller 201 that rotatably support a substrate 175 of an endless belt shaped intermediate transfer member and rotate it in the arrow direction; tension-providing unit 202 that pulls the driven roller 201 in the arrow direction; and first power supply 25 connected to roll electrode 20a. Second film-forming device 2b2 includes: roll electrode 20b and driven roller 201 that rotatably support substrate 175 of an intermediate transfer member in an endless form and rotate it in the arrow direction; tension-providing unit 202 that pulls driven roller 201 in the arrow direction; and second power supply 26 connected to roll electrode 20b.

Further, second manufacturing apparatus 2b includes electric discharge space 23b where electric discharge is performed in a facing region between roll electrode 20a and roll electrode 20b.

Mixed gas supply device 24b supplies a mixed gas of a raw material gas, and nitrogen gas or a rare gas such as argon gas, into discharge space 23b, in order to form a film possessing at least one layer selected from an inorganic oxide layer, an inorganic nitride layer, and an inorganic carbide film.

First power supply 25 provides a voltage of frequency $\omega 1$, second power supply 26 provides a voltage of frequency of $\omega 2$, and these voltages generate electric field V where frequencies $\omega 1$ and $\omega 2$ are superposed in discharge space 23b. Electric field V plasmatizes (excites) mixed gas G. Surfaces of substrates 175 of first film-forming device 2b1 and second film-forming device 2b2 are exposed to plasmatized (excited) mixed gas, so as to deposit and form respective films (surface layers) on the surfaces of substrate 175 of first film-forming device 2b1 and substrate 175 of second film-forming device 2b2 simultaneously, corresponding to the raw material gas contained in the plasmatized (excited) mixed gas.

Herein, facing roll electrode 20a and roll electrode 20b are disposed at a predetermined distance therebetween.

Further, as another embodiment, one roll electrode among roll electrode 20a and roll electrode 20b may be grounded, while the other roll electrode being connected to a power supply. As the power supply in this case, the second power supply is preferably employed to achieve dense thin film-forming, and preferably employed in the case of using rare gas, such as argon, specifically as discharge gas.

Embodiments of the atmospheric pressure plasma CVD apparatus by which surface layer 176 is formed on substrate 175 will be described below in detail.

Figure 8:
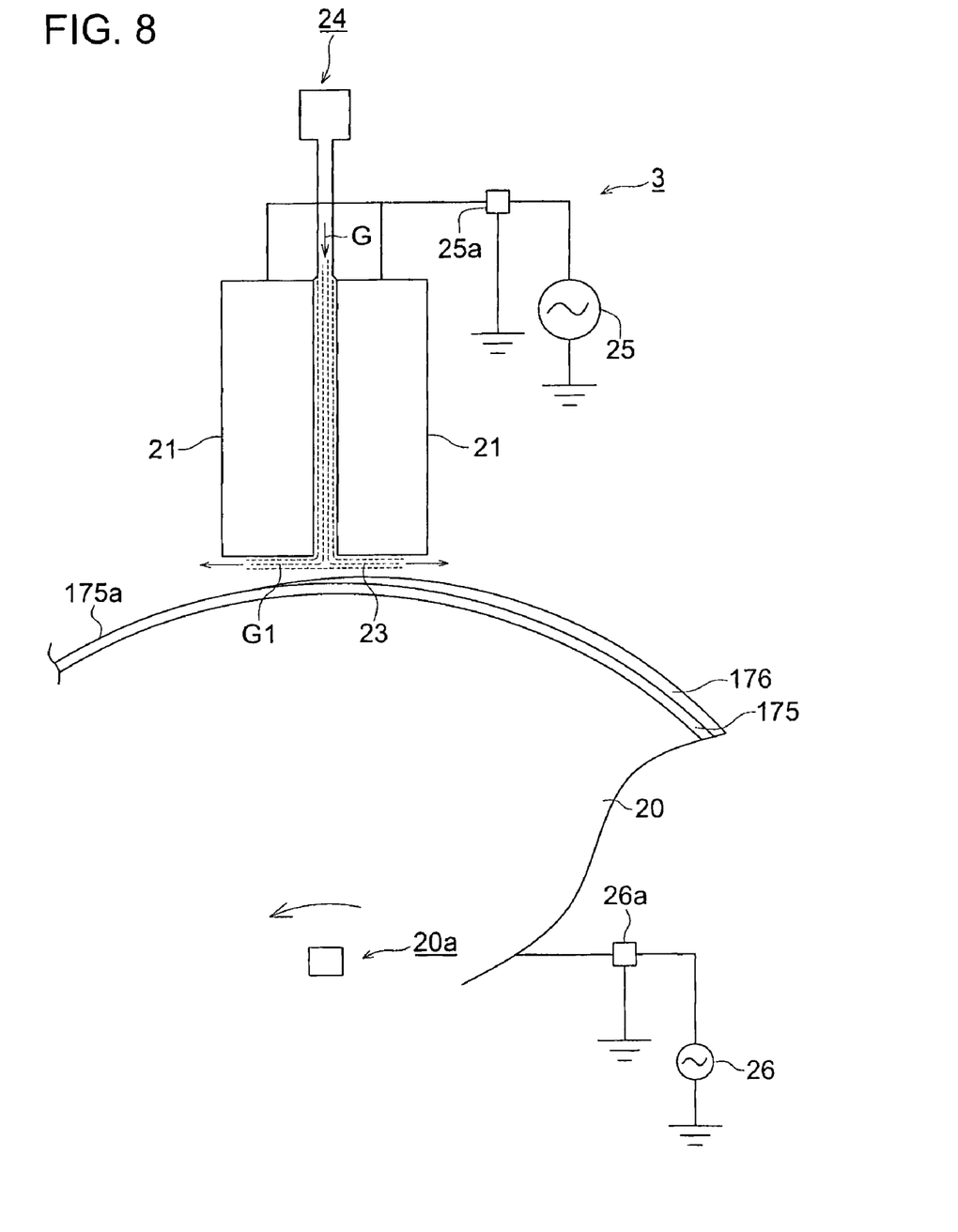
FIG. 8 is a schematic diagram of a first plasma film-forming apparatus to produce an intermediate transfer member employing plasma.

In addition, FIG. 8 is a section in which the dashed area in FIG. 6 is mainly extracted.

FIG. 8 is a schematic diagram of a first plasma film-forming apparatus to produce an intermediate transfer member employing plasma.

An example of an atmospheric pressure plasma CVD apparatus which is preferably used to form surface layer 176 will be described, referring to FIG. 8.

Atmospheric pressure plasma CVD apparatus 3 includes at least one pair of rollers for rotatably supporting a substrate removably and rotationally drive the substrate, and includes at least one pair of electrodes for performing plasma discharge, wherein one electrode of the pair of electrodes is one roller of the pair of rollers, and the other electrode is a fixed electrode facing the one roller through the substrate. Atmospheric pressure plasma CVD apparatus 3 is an apparatus of manufacturing an intermediate transfer member and exposes the substrate to plasma generated in the facing area between the one roller and the fixed electrode so as to deposit and form the foregoing surface layer. Atmospheric pressure plasma CVD device 3 is preferably used in the case of employing nitrogen gas as discharge gas, for example, and applies a high voltage via one power supply, and applies a high frequency via another power supply so as to start discharging stably and perform discharge continuously.

Atmospheric pressure plasma CVD apparatus 3 includes, as described above, mixed gas supply device 24, fixed electrode 21, first power supply 25, first filter 25a, roll electrode 20, drive unit 20a for rotationally driving the roll electrode in the arrow direction, second power supply 26, and second filter 26a, and performs plasma discharge in discharge space 23 to excite mixed gas G of a raw material gas with a discharge gas, and exposes substrate surface 175a to excited mixed gas G1 so as to deposit and form surface layer 176 on the substrate surface.

A first high frequency voltage of frequency of $\omega 1$ is applied to fixed electrode 21 from first power supply 25, and a high frequency voltage of frequency of $\omega 2$ is applied to roll electrode 20 from second power supply 26. Thus, an electric field is generated between fixed electrode 21 and role electrode 20 where frequency $\omega 1$ at electric field intensity $V_1$ and frequency $\omega 2$ at electric field intensity $V_2$ are superposed. Current $I_1$ flows through fixed electrode 21, current $I_2$ flows through roll electrode 20, and plasma is generated between the electrodes.

Herein, the relationship between frequency $\omega 1$ and frequency $\omega 2$, and the relationship between electric field intensity $V_1$, electric field intensity $V_2$, and electric field intensity IV that starts discharge of discharge gas satisfy $\omega 1 < \omega 2$, and satisfy $V_1 \geqq IV > V_2$ or $V_1 > IV \geqq V_2$, wherein the output density of the second high frequency electric field is at least 1 W/cm².

Since electric field intensity IV to start electric discharge of nitrogen gas is 3.7 kV/mm, it is preferable that at least electric field intensity $V_1$ applied from first power supply 25 is 3.7 kV/mm or higher, and electric field intensity $V_2$ applied from second high frequency power supply 60 is 3.7 kV/mm or lower.

As first power supply 25 (high frequency power supply) applicable to first atmospheric pressure plasma CVD apparatus 3, any of the following commercially available power supplies can be used.

| Applied Power supply symbol | Manufacturer | Frequency | Product name |
|---|---|---|---|
| A1 | Shinko Electric Co., Ltd. | 3 kHz | SPG3-4500 |
| A2 | Shinko Electric Co., Ltd. | 5 kHz | SPG5-4500 |
| A3 | Kasuga Electric Works, Ltd. | 15 kHz | AGI-023 |
| A4 | Shinko Electric Co., Ltd. | 50 kHz | SPG50-4500 |
| A5 | Haiden Laboratory Inc. | 100 kHz* | PHF-6k |
| A6 | Pearl Kogyo Co., Ltd. | 200 kHz | CF-2000-200k |

-continued

| Applied Power supply symbol | Manufacturer | Frequency | Product name |
|---|---|---|---|
| A7 | Pearl Kogyo Co., Ltd. | 400 kHz | CF-2000-400k |
| A8 | SEREN IPS | 100-460 kHz | L3001 |

As second power supply 26 (high frequency power supply), any of the following commercially available power supplies can be used.

| Applied Power supply symbol | Manufacturer | Frequency | Product name |
|---|---|---|---|
| B1 | Pearl Kogyo Co., Ltd. | 800 kHz | CF-2000-800k |
| B2 | Pearl Kogyo Co., Ltd. | 2 MHz | CF-2000-2M |
| B3 | Pearl Kogyo Co., Ltd. | 13.56 MHz | CF-5000-13M |
| B4 | Pearl Kogyo Co., Ltd. | 27 MHz | CF-2000-27M |
| B5 | Pearl Kogyo Co., Ltd. | 150 MHz | CF-2000-150M |
| B6 | Pearl Kogyo Co., Ltd. | 22-99.9 MHz | RP-2000-20/100M |

Regarding the above described power supplies, the power supply marked * is an impulse high frequency power supply of Haiden Laboratory (100 kHz in continuous mode). High frequency power supplies other than the power supply marked * are capable of applying only continuous sine waves.

In the present invention, regarding the power supplied between the facing electrodes from the first and second power supplies, a power (output density) of at least 1 W/cm$^2$ is supplied to fixed electrode 21 so as to excite discharge gas, and plasma is generated to form a thin film. The upper limit of the power to be supplied to fixed electrode 21 is preferably 50 W/cm$^2$, and more preferably 20 W/cm$^2$. The lower limit is preferably 1.2 W/cm$^2$. Herein, the discharge area (cm$^2$) means the area of the range where discharge is generated at the electrode.

Further, by also supplying roll electrode 20 with a power (output density) of at least 1 W/cm$^2$, the output density can be improved while maintaining uniformity of the high frequency electric field. Thus, plasma with highly even density can be generated, which improves both a film-forming rate and film quality. The power is preferably at least 5 W/cm$_2$. The upper limit of the power to be supplied to roll electrode 20 is preferably 50 W/cm$^2$.

Herein, waveforms of high frequency electric fields are not specifically limited, and can be in continuous oscillation mode of a continuous sine wave form called a continuous mode, and also in intermittent oscillation mode called a pulse mode performing ON/OFF intermittently, either of which may be employed. However, at least, the high frequency to be supplied to roll electrode 20 preferably has a continuous sine wave to obtain a dense film exhibiting good quality.

Further, first filter 25a is provided between fixed electrode 21 and first power supply 25 to allow a current to flow easily from first power supply 25 to fixed electrode 21, and the current from second power supply 26 is grounded to inhibit a current running from second power supply 26 to first power supply 25. Second filter 26a is provided between roll electrode 20 and second power supply 26 to allow a current to flow easily from second power supply 26 to roll electrode 20, and the current from first power supply 21 is grounded to inhibit a current running from first power supply 25 to second power supply 26.

Regarding electrodes, it is preferable to employ electrodes capable of applying a high electric field, as described above, and maintaining a uniform and stable discharge state. For durability against discharge by a high electric field, the dielectric material described below is coated on at least one surface of each of fixed electrode 21 and roll electrode 20.

In the above description, regarding the relationship between the electrode and the power supply, second power supply 26 may be connected to fixed electrode 21, and first power supply 25 may be connected to roll electrode 20.

Figure 9:
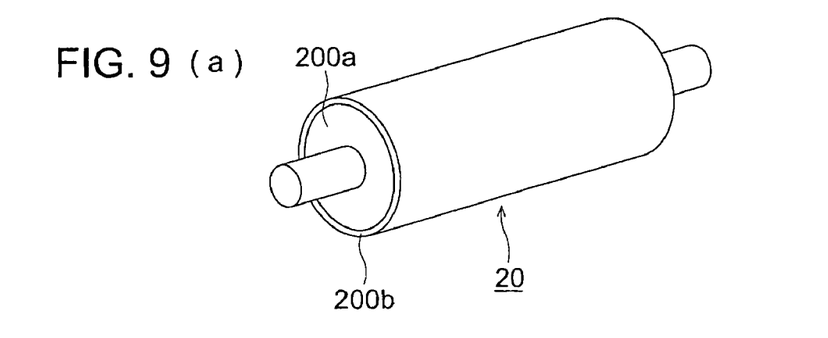

FIG. 9(a) and FIG. 9(b) each are a schematic diagram showing an example of the roll electrode.

The structure of roll electrode 20 will be described below. As shown in FIG. 9(a), roll electrode 20 is constructed with conductive base material 200a (hereinafter, referred to also as "electrode base material") made of metal or the like, onto which ceramic-coated dielectric material 200b (hereinafter, also referred to simply as "dielectric material") which has been subjected to a sealing treatment with an inorganic material after thermally spraying is coated. As the ceramic material to be used for spraying, alumina, silicon nitride or the like is preferably used, but alumina is specifically preferable in view of easy workability.

Further, as shown in FIG. 9(b), roll electrode 20' may be constructed with conductive base material 200A made of metal or the like onto which lining-treated dielectric material 200B fitted with an inorganic material by lining is coated. As the lining material, silicate glass, borate glass, phosphate glass, germinate glass, tellurite glass, aluminate glass, vanadate glass or the like is preferably used, but borate glass is specifically preferable in view of easy workability.

Examples of conductive base materials 200a and 200A made of metal or the like include silver, platinum, stainless steel, aluminum, titanium, iron and so forth, but stainless steel is preferable in view of easy workability.

In the present embodiment, a stainless-steel jacket-roll base material (not shown) fitted with a cooling device by using cooling water is employed for base materials 200a and 200A of the roll electrodes.

Figure 10:
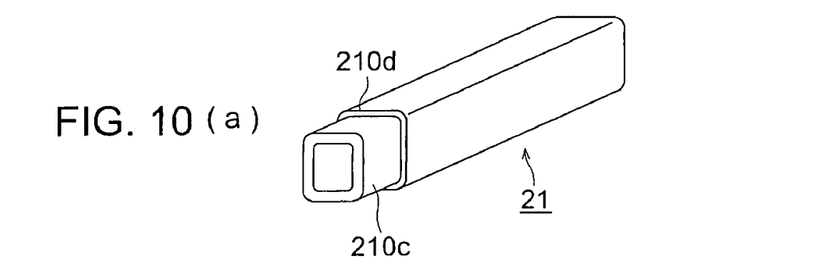

FIG. 10(a) and FIG. 10(b) each are a schematic diagram showing an example of fixed electrodes.

In FIG. 10(a), fixed electrode 21 of a prismatic or rectangular tube is constructed, similarly to the above-described roll electrode 20, with conductive base material 210c made of metal or the like, onto which ceramic-coated dielectric material 200d which has been subjected to a sealing treatment with an inorganic material after thermally spraying is coated. Further, as shown in FIG. 10(b), fixed electrode 21' of a prismatic or rectangular tube may be constructed with conductive base material 210A made of metal or the like, onto which lining-processed dielectric material 210B fitted with an inorganic material by lining is coated.

An example of a film-forming process in which surface layer 176 is formed and deposited on substrate 175 among processes in a method of manufacturing an intermediate transfer member will be described below, referring to FIGS. 6 and 8.

In FIGS. 6 and 8, substrate 175 is tension-supported around roll electrode 20 and driven roller 201, then a predetermined tension is applied to substrate 175 via operation of tension-providing unit 202, and thereafter, roll electrode 20 is rotationally driven at a predetermined rotation speed.

Mixed gas supply device 24 produces mixed gas G and flows mixed gas G into electric discharge space 23.

A voltage of frequency ω1 is output from first power supply 25 to be applied to fixed electrode 21, and a voltage of frequency ω2 is output from second power supply 26 to be applied to roll electrode 20. These voltages generate electric field V in discharge space 23 with frequency ω1 and frequency ω2 superposed with each other.

Mixed gas G introduced into discharge space 23 is excited by electric field V to make a plasma state. Then, the surface of the substrate is exposed to mixed gas G in the plasma state, and surface layer 176 possessing at least one layer selected from an inorganic oxide film, an inorganic nitride film and an inorganic carbide film is formed on substrate 175 employing a raw material gas in mixed gas G.

In such a manner, the resulting surface layer may be a surface layer composed of plural layers, but at least one layer among the plural layers preferably contains carbon atoms in an amount of 0.1-20% by weight determined via XPS measurement of the carbon atom content.

For example, in the above-described atmospheric pressure plasma CVD apparatus 3, the mixed gas (discharge gas) is plasma-excited between a pair of electrodes (roll electrode 20 and fixed electrode 21), and a raw material gas containing carbon atoms existing in this plasma is radicalized to expose the surface of substrate 175 thereto. Upon the surface of substrate 175 exposed to carbon-containing molecules and carbon-containing radicals, they are contained in the surface layer.

A discharge gas refers to a gas being plasma-excited in the above described conditions, and can be nitrogen, argon, helium, neon, krypton, xenon or a mixture thereof.

As a raw material gas to form a surface layer, an organometallic gas being in a gas or liquid state at room temperature is used, and an alkyl metal compound, a metal alkoxide compound and an organometallic complex compound are specifically used. The phase state of these raw materials is not necessarily a gas phase at normal temperature and pressure. A raw material capable of being vaporized through melting, evaporating, sublimation or the like via heating or reduced pressure with mixed gas supply device 24 can be used either in a liquid phase or solid phase.

The raw material gas is one being in a plasma state in discharge space and containing a component to form a thin film, and is an organometallic compound, an organic compound, an inorganic compound or the like.

Examples of silicon compounds include silane, tetramethoxysilane, tetraethoxysilane (TEOS), tetra-n-propoxysilane, tetra-iso-propoxysilane, tetra-n-butoxysilane, tetra-t-butoxysilane, dimethyldimethoxysilane, dimethyldiethoxysilane, diethyldimethoxysilane, diphenyldimethoxysilane, methyltriethoxysilane, ethyltrimethoxysilane, phenyltriethoxysilane, (3,3,3-trifluoropropyl)trimethoxysilane, hexamethyldisyloxane, bis(dimethylamino) dimethylsilane, bis(dimethylamino)methylvinylsilane, bis(ethylamino)dimethylsilane, N,O-bis(trimethylsilyl)acetoamide, bis(trimethylsilyl)carbodiimide, diethylaminotrimethylsilane, dimethylaminodimethylsilane, hexamethyldisilazane, heaxamethylcyclotrisilazane, heptamethylsilazane, nonamethyltrisilazane, octamethylcyclotetrasilazane, tetrakisdimethyaminosilazane, tetraisocyanatesilane, tetramethyldisilazane, tris(dimethylamino)silane, triethoxyfluorosilane, allyldimethylsilane, allyltrimethylsilane, benzyltrimethylsilane, bis(trimethylsilyl)acetylene, 1,4-bistrimethylsilyl-1,3-butadiene, di-t-butylsilane, 1,3-disilabutane, bis(trimethylsilyl)methane, cyclopentanedienyltrimethylsilane, phenyldimethylsilane, phenyltrimethylsilane, propagyltrimethylsilane, tetramethylsilane, trimethylsilylacetylene, 1-(trimethylsilyl)-1-propine, tris(trimethylsilyl)methane, tris(trimethylsilyl)silane, vinyltrimethylsilane, hexamethyldisilane, octamethylcyclotetrasiloxane, tetramethylcyclotetrasiloxane, heaxmethylcycrotetrasiloxane and M-silicate 51, but are not limited thereto.

Examples of titanium compounds include organometallic compounds such as tetradimethylamino titanium and so forth; metal hydrogen compounds such as monotitanium, dititanium and so forth; metal halogenated compounds such as titanium dichloride, titanium trichloride, titanium tetrachloride and so forth; and metal alkoxides such as tetraethoxy titanium, tetraisopropoxy titanium, tetrabutoxy titanium and so forth, but are not limited thereto.

Examples of aluminum compounds include aluminum n-butoxide, aluminum s-butoxide, aluminum t-butoxide, aluminum diisopropoxideethyl acetoacetate, aluminum ethoxide, aluminum hexafluodoropentanedionato, aluminum isopropoxide, aluminum III 2,4-pentanedionato, dimethyl aluminum chloride and so forth, but are not limited thereto.

Examples of zinc compounds include zinc bis{bis(trimethylsilyl)amide}, zinc 2,4-pentanedionato, zinc 2,2,6,6-tetramethyl-3,5-heptanedionato and so forth, but are not limited thereto.

Examples of zirconium compounds include zirconium t-butoxide, zirconium diisopropoxide bis(2,2,6,6-tetramethyl-3,5-heptanedionato, zirconium ethoxy, zirconium hexafluoropentanedionato), zirconium isopropoxide, zirconium 2-methyl-2-butoxide, zirconium trifluoropentanedionato and so forth, but are not limited thereto.

Further, the above-described raw material may be used singly, or by mixing components of at least two kinds.

In addition, as described before, hardness of the surface layer can be adjusted by a film-forming rate, an addition gas amount ratio, and so forth.

Surface layer 176 is formed on the surface of support 175 to provide an intermediate transfer member exhibiting high transferability together with high cleaning ability and durability.

EXAMPLE

Next, the present invention will now be specifically described referring to examples, but embodiments of the present invention are not limited thereto.

1. Preparation of Sample

Three kinds of substrates A, B and C were prepared as described below.

| (Substrate A) | |
|---|---|
| Polyphenylenesulfide resin "E2180" (produced by Toray Co., Ltd.) | 100 parts by weight |
| Conductive filler "Furnace #3030B" (produced by Mitsubishi Chemical Corp.) | 16 parts by weight |
| Graft copolymer "MODIPER A4400" (produced by Ninon Yushi Co., Ltd.) | 1 part by weight |
| Lubricant (calcium montanate) | 0.2 parts by weight |

The above-described composition was put into a single-axis extruder, and molten and kneaded to prepare a resin mixture. The resin mixture was extruded into a seamless belt shape through a ring shaped die having a seamless belt-shaped discharge opening attached at the end of the extruder. The extruded seamless belt-shaped resin mixture was introduced into a cooling cylinder provided at a discharging opening, and cooled and solidified to prepare a seamless cylindrical intermediate transfer belt. The resulting substrate had a thickness of 120 μm.

| (Substrate B) | |
|---|---|
| N-methyl pyrrolidinone (NMP) | 600 parts by weight |
| 3,3',4,4'-benzophenone tetracarboxylic dianhydride (BPDA) | 100 parts by weight |
| 4,4'-diaminodiphenyl ether (DATE) | 62 parts by weight |
| Carbon black | 24 parts by weight |

After conducting condensation·imidization reaction of 3,3',4,4'-benzophenone tetracarboxylic dianhydride with 4,4'-diaminodiphenyl ether in a N-methyl pyrrolidinone solvent at 25° C., a conductive filler was dispersed and mixed employing a ball mill to obtain a stock solution. The stock solution was evenly cast in a cylindrical die, the solvent was vaporized and removed while applying heat and rotation, and a heat treatment was conducted at 350° C. for 30 minutes to obtain a seamless cylindrical intermediate transfer belt. The resulting substrate had a thickness of 90 μm.

| (Substrate C) | |
|---|---|
| Polyvinylidene fluoride copolymer (KYNAR2800-20, produced by Arkema K.K.) | 100 parts by weight |
| Carbon black | 10 parts by weight |

The above-described composition was put into a single-axis extruder, and molten and kneaded to prepare a resin mixture. The resin mixture was extruded into a seamless belt shape through a ring shaped die having a seamless belt-shaped discharge opening attached at the end of the extruder. The extruded seamless belt-shaped resin mixture was introduced into a cooling cylinder provided at a discharging opening, and cooled and solidified to prepare a seamless cylindrical intermediate transfer belt. The resulting substrate had a thickness of 150 μm.

Hardness of each substrate was measured employing a universal hardness meter (an ultrafine hardness tester H-100, manufactured by Fischer Instrument Inc.) under the conditions of 2 mN as the maximum load with quadrangular pyramid (Vickers) for an indenter, provided that the measurement is conducted with weak stress so as not to exceed a push-in depth of 2 μm of the surface layer. Results are shown in Table 1.

Next, one inorganic compound layer of 350 nm thick as a surface layer was formed on this substrate employing a plasma discharge treatment apparatus shown in FIG. 6. Examples of the material used for the surface layer include titanium oxide, silicon oxide and aluminum oxide. As a usable dielectric covering each electrode fitted into the plasma discharge treatment apparatus in this case, alumina of a thickness of 1 mm was coated on each of both facing electrodes via thermally sprayed ceramic treatment. The spacing between the electrodes was set to 0.5 mm. A metal base material on which a dielectric was coated was prepared in accordance to the stainless jacket specification having a cooling function with cooling water, and the plasma discharge treatment was conducted while controlling electrode temperature with cooling water during discharging. Power supplies used here will be described in detail later.

Examples and Comparative examples shown in Table 1 were prepared by varying film-forming conditions of the surface layer. After vapor is produced by heating each raw material, and is mixed and diluted with a discharge gas and a reactive gas which have been preheated in advance, the resulting has been supplied into the discharge space.

(Titanium Oxide Layer)
Discharge gas: $N_2$ gas
Reactive gas: 21% by volume of $O_2$ gas, based on the total gas
Raw material gas: 0.1% by volume of tetraisopropoxy titanium (TTIP), based on the total gas
Power supply electric power on the low frequency side {high frequency power supply (110 kHz) manufactured by SEREN IPS}: 10 W/cm$^2$
Power supply electric power on the high frequency side {high frequency power supply (13.56 MHz) manufactured by Pearl Kogyo Co., Ltd.}: 1-10 W/cm$^2$ (Silicon Oxide Layer)
Discharge gas: $N_2$ gas
Reactive gas: 21% by volume of $O_2$ gas, based on the total gas
Raw material gas: 0.1% by volume of tetraethoxysilane (TEOS), based on the total gas
Power supply electric power on the low frequency side {high frequency power supply (50 kHz) manufactured by Shinko Electric Co., Ltd.}: 10 W/cm$^2$ Power supply electric power on the high frequency side {high frequency power supply (13.56 MHz) manufactured by Pearl Kogyo Co., Ltd.}: 1-10 W/cm$^2$ (Aluminum Oxide Layer)
Discharge gas: $N_2$ gas
Reactive gas: 4.0% by volume of $H_2$ gas, based on the total gas
Raw material gas: 0.1% by volume of tri s-butoxide aluminum, based on the total gas
Power supply electric power on the low frequency side {impulse high frequency power supply (100 kHz) manufactured by Haiden Laboratory}: 10 W/cm$^2$
Power supply electric power on the high frequency side {wide band high frequency power supply (40.0 MHz) manufactured by Pearl Kogyo Co., Ltd.}: 1-10 W/cm$^2$ Surface hardness of the surface layer of the prepared sample was measured via a nanoindentation method employing a measuring device (NANO Indenter XP/DCM, manufactured by MTS Systems Corp./MTS NANO Instruments, Inc.), and it was measured at the maximum load of approximately 25 μN under the condition of sufficiently small push-in depth with respect to the surface layer thickness employing transducer 31 and diamond Berkovich indenter 32 having an equilateral-triangular tip shape.

2. Evaluation Method (1) Evaluation Method of Secondary Transfer Ratio of Toner

The secondary transfer ratio is a ratio of "toner weight of a toner image transferred onto a recording paper sheet" to "toner weight of a toner image formed on an intermediate transfer member", and the evaluation was conducted as described below.

Test printing is conducted on a Konica Minolta, CF paper sheet in the maximum toner density for yellow, magenta, cyan and black with a polymerization toner having an average particle diameter of 6.5 μm employing Magicolor 5440DL (produced by Konica Minolta Holdings, Inc.) fitted into a printer. A toner adhering amount on a test print paper sheet and a residual toner amount on a belt were converted into the toner adhering amount from the measured result of optical (reflection) density to obtain a toner transfer ratio.

Transfer ratio(%)=[1−{Residual toner amount on the belt/(Toner amount on print paper sheet+Residual toner amount on the belt)}]×100

Toner transferability between the primary transfer and the secondary transfer during printing of a two-color-superimposing solid image was evaluated as transfer efficiency. The primary transfer efficiency is a ratio of "weight of a toner image transferred onto an intermediate transfer member" to "weight of a toner image formed on a photoreceptor". The secondary transfer efficiency is a ratio of "weight of a toner image transferred onto a recording paper sheet" to "weight of a toner image formed on an intermediate transfer member".

A: A transfer efficiency of not less than 95%
B: A transfer efficiency of not less than 90% and less than 95%
C: A transfer efficiency of less than 90%

(2) Cleaning Ability

After cleaning the surface of an intermediate transfer member with a cleaning blade, employing the above-described printer, the surface condition of the intermediate transfer member was visually observed to confirm the adhering condition to toner. The evaluation was ranked as follows.

A: No adhesion of toner is observed.
B: Slight adhesion of toner is observed, but practically with no problem.
C: Adhesion of toner is observed, and practically with a problem (3) Durability Test Printing of 200,000 paper sheets was made with a test pattern having an image ratio of 5% for each color, and Konica Minolta CF paper (A4 in size), employing the above-described printer to subsequently evaluate the secondary transfer ratio of toner, and to visually examine the print quality. The evaluation was ranked as follows.

A: No change is observed up to the 200,000$^{th}$ print from the initial stage of printing (OK).
B: Slight change is observed, but practically with no problem.
C: Change is observed, and practically with a problem (NG).

As to the above-described items, measured results and evaluation results of Examples 1-20 and Comparative examples 1-9 are shown in Table 1.

TABLE 1

| | Substrate | | Inorganic compound layer | | | Thickness of surface layer | *4 | *5 | *6 | |
|---|---|---|---|---|---|---|---|---|---|---|
| *1 | *2 | Hardness (N/mm$^2$) | *2 | Hardness (GPa) | *3 | | | | | |
| 1 | C | 40 | SiO$_2$ | 3 | 20 | 350 | B | B | C | Comp. 1 |
| 2 | A | 50 | SiO$_2$ | 3 | 20 | 350 | A | A | A | Ex. 1 |
| 3 | B | 190 | SiO$_2$ | 3 | 20 | 350 | A | A | A | Ex. 2 |
| 4 | C | 40 | SiO$_2$ | 2 | 20 | 350 | B | C | C | Comp. 2 |
| 5 | A | 50 | SiO$_2$ | 2 | 20 | 350 | B | C | C | Comp. 3 |
| 6 | B | 190 | SiO$_2$ | 2 | 20 | 350 | A | B | C | Comp. 4 |
| 7 | C | 40 | SiO$_2$ | 9 | 0 | 350 | A | B | C | Comp. 5 |
| 8 | A | 50 | SiO$_2$ | 9 | 0 | 350 | A | A | A | Ex. 3 |
| 9 | B | 190 | SiO$_2$ | 9 | 0 | 350 | A | A | A | Ex. 4 |
| 10 | A | 50 | SiO$_2$ | 3 | 5 | 350 | A | A | A | Ex. 5 |
| 11 | A | 50 | SiO$_2$ | 5 | 0.3 | 350 | A | A | A | Ex. 6 |
| 12 | A | 50 | SiO$_2$ | 7 | 0.1 | 350 | A | A | A | Ex. 7 |
| 13 | A | 50 | SiO$_2$ | 8 | 0.1 | 350 | A | A | A | Ex. 8 |
| 14 | A | 50 | SiO$_2$ | 3 | 20 | 350 | A | A | A | Ex. 9 |
| 15 | A | 50 | SiO$_2$ | 3 | 25 | 350 | B | B | C | Comp. 6 |
| 16 | A | 50 | SiO$_2$ | 9 | 0 | 250 | A | A | A | Ex. 10 |
| 17 | A | 50 | SiO$_2$ | 9 | 0 | 500 | A | A | A | Ex. 11 |
| 18 | B | 190 | SiO$_2$ | 3 | 5 | 350 | A | A | A | Ex. 12 |
| 19 | B | 190 | SiO$_2$ | 9 | 0 | 350 | A | A | A | Ex. 13 |
| 20 | B | 190 | SiO$_2$ | 3 | 20 | 350 | A | A | A | Ex. 14 |
| 21 | B | 190 | SiO$_2$ | 9 | 0 | 350 | A | A | B | Ex. 15 |
| 22 | B | 190 | SiO$_2$ | 3 | 25 | 350 | B | B | C | Comp. 7 |
| 23 | B | 190 | SiO$_2$ | 9 | 0 | 500 | A | A | A | Ex. 16 |
| 24 | A | 50 | SiO$_2$ | 7 | 0.1 | 180 | A | A | C | Comp. 8 |
| 25 | A | 50 | SiO$_2$ | 7 | 0.1 | 200 | A | A | A | Ex. 17 |
| 26 | A | 50 | SiO$_2$ | 7 | 0.1 | 1000 | A | B | A | Ex. 18 |
| 27 | A | 50 | SiO$_2$ | 7 | 0.1 | 1100 | B | B | C | Comp. 9 |
| 28 | A | 50 | TiO$_2$ | 7 | 0 | 350 | A | A | A | Ex. 19 |
| 29 | A | 50 | Al$_2$O$_3$ | 11 | 0 | 350 | A | A | A | Ex. 20 |

*1 Sample No.
*2 Material
*3 Carbon content (% by weight)
*4 Transfer efficiency
*5 Cleaning ability
*6 Durability (×1000 paper sheets)
Comp.: Comparative example
Ex.: Example Effects produced through the objective of the present invention can be confirmed from the results of Table 1 as described below.

(1) By comparison employing Sample Nos. 1-9, 28 and 29, when a substrate has a universal hardness of 50-190 N/mm$^2$, and a surface layer has a surface hardness of 3-11 GPa measured in accordance with a nanoindentation method, confirmed has been an intermediate transfer member exhibiting an excellent releasing property between with toner, together with improved transfer efficiency and excellent durability.

(2) By comparison employing Sample Nos. 14 and 15, when the outermost layer of the surface layer has a carbon atom content of 20% by weight obtained via XPS measurement, confirmed has been an intermediate transfer member exhibiting higher transfer efficiency together with excellent cleaning ability and durability.

(3) By comparison employing Sample Nos. 24-27, when the surface layer has a thickness of 200-1000 nm, confirmed has been an intermediate transfer member exhibiting higher transfer efficiency together with excellent cleaning ability and durability.

Accordingly, in the present invention, provided can be an intermediate transfer member exhibiting high transfer efficiency together with excellent cleaning ability and durability, a method of manufacturing the intermediate transfer member, and an image forming apparatus fitted with the intermediate transfer member.

What is claimed is:

1. An intermediate transfer member comprising a substrate and a surface layer,
    wherein the substrate has a universal hardness of 50-190 N/mm$^2$, and the surface layer has a surface hardness of 3-11 GPa measured in accordance with a nanoindentation method.

2. The intermediate transfer member of claim 1,
    wherein the surface layer has a thickness of 200-1000 nm.

3. A method of manufacturing an intermediate transfer member, comprising the step of:
    forming at least an outermost layer of a surface layer on a substrate by an atmospheric pressure plasma CVD method,
    wherein the at least an outermost layer has a carbon atom content of 20 atomic percent or less, determined via XPS measurement, and
    wherein the intermediate transfer member comprises the substrate and the surface layer according to claim 1.

4. A method of manufacturing an intermediate transfer member, comprising the step of:
    forming at least a layer of a surface layer on a substrate by an atmospheric pressure plasma CVD method,
    wherein the at least a layer has a carbon atom content of 20 atomic percent or less, determined via XPS measurement, and
    wherein the intermediate transfer member comprises the substrate and the surface layer according to claim 1.

5. An image forming apparatus comprising:
    an intermediate transfer member,
    wherein a toner image is formed by developing a surface of an image carrier, and the toner image is transferred into the intermediate transfer member and subsequently further transferred into a transfer paper sheet
    wherein the intermediate transfer member comprises the substrate and the surface layer according to claim 1.

6. The intermediate transfer member of claim 1,
    wherein the surface layer is composed of at least one layer.

* * * * *